United States Patent [19]
Guertler

[11] Patent Number: 5,464,266
[45] Date of Patent: Nov. 7, 1995

[54] MOTOR VEHICLE WITH A STIFF FLOOR STRUCTURE

[75] Inventor: Dieter Guertler, Stuttgart, Germany

[73] Assignee: Mercedes-Benz AG, Stuttgart, Germany

[21] Appl. No.: 286,223

[22] Filed: Aug. 5, 1994

[30] Foreign Application Priority Data

Aug. 5, 1993 [DE] Germany ............... 43 26 270.8

[51] Int. Cl.⁶ .................................................. B60R 27/00
[52] U.S. Cl. .................... 296/189; 293/109; 296/146.6; 296/188
[58] Field of Search ...................... 296/188, 189, 296/146.6, 146.5; 293/109, 128, 136

[56] References Cited

U.S. PATENT DOCUMENTS

| | | | |
|---|---|---|---|
| 3,787,083 | 1/1974 | Perlberg | 293/109 |
| 3,881,767 | 5/1975 | Klees | 293/136 X |
| 4,934,751 | 6/1990 | Shimoda | 296/188 |
| 5,131,703 | 7/1992 | Stirling | 293/127 |
| 5,207,475 | 5/1993 | Hellstrom | 296/188 |
| 5,306,066 | 4/1994 | Saathoff | 296/189 X |

FOREIGN PATENT DOCUMENTS

| | | |
|---|---|---|
| 2816318 | 10/1978 | Germany. |
| 3928869 | 3/1990 | Germany. |
| 1531021 | 11/1978 | United Kingdom. |
| WO91/04174 | 4/1991 | WIPO. |

OTHER PUBLICATIONS

UK Search Report of Aug. 31, 1994.

*Primary Examiner*—Robert J. Oberleitner
*Assistant Examiner*—Kia M. Robinson
*Attorney, Agent, or Firm*—Evenson McKeown Edwards & Lenahan

[57] ABSTRACT

A stiff vehicle floor structure is arranged in a common plane with vehicle bumpers. A plurality of energy-absorbing impact elements are distributed spaced from one another along the length of a vehicle passenger compartment and at the height of the floor structure. The impact elements are provided in side body parts of the vehicle and serve to contribute to transverse stiffness of the vehicle by absorbing the impact energy and transferring collision forces to the floor structure.

8 Claims, 1 Drawing Sheet

MOTOR VEHICLE WITH A STIFF FLOOR STRUCTURE

BACKGROUND AND SUMMARY OF THE INVENTION

The invention relates to a motor vehicle having a front and a rear bumper, having a stiff floor structure and having body parts which laterally bound a passenger compartment. At least one energy-absorbing impact element which contributes to the transverse stiffening of the motor vehicle is arranged in the region of the front seats of the passenger compartment.

It is known from German Patent Document DE 28 16 318 C2 and DE 39 28 869 A1 additionally to arrange, in a motor vehicle with a stiff floor structure, a transverse stiffening structure over the width of the motor vehicle in the region of the front seats at the height of the bumpers of an impacting vehicle. This transverse stiffening structure has energy-absorbing impact elements in the side doors. The weight of the motor vehicle is increased by the provision of a transverse stiffening structure in addition to the stiff floor group.

An object of the invention is to create a motor vehicle, of the type mentioned above, which has adequate stiffness relative to side impact loads but without complicated additional devices.

This object is achieved according to preferred embodiments of the invention in that a stiff floor structure is arranged in a common plane at the height of the bumpers and a plurality of energy-absorbing impact elements, which are distributed over the length of the passenger compartment, are provided in the side body parts at the height of the floor structure. Because the floor structure is already arranged at the height of the bumpers, additional transverse stiffening is avoided in this region. Because of the arrangement of the side impact elements over the length of the passenger compartment, the motor vehicle is sufficiently protected against side impact loads over the whole of the side regions.

The advantages of prior art arrangements can therefore be achieved with a substantially reduced outlay and without a substantial increase in the weight of the vehicle. This is because only the energy-absorbing impact elements, whose weight is relatively small due to their structure, are required as additional elements. Plastic or aluminum honeycombs, plastic foams, aluminum extrusion profiles or aluminum or steel sheet-metal elements are exemplary elements employed as the impact elements.

The measures according to the invention are of particular advantage in the case of four-door vehicles because the occupants of the vehicle are protected against side impact loads both in the region of the front seats and in the region of the rear seats. In addition, the USA safety standards for which additional stiffening tubes were previously necessary in the side doors, are already satisfied by means of the measures according to the invention. The actual passenger compartment is displaced upwards by the invention because it adjoins the floor structure in an upwards direction.

In a preferred embodiment of the invention, the height of the impact elements corresponds to the height of the floor structure and their width corresponds approximately to the distance between the outer skin of the respective side body part and the side edge of the floor structure. By this means, a force path exists immediately between the impact elements and the floor structure in the case of a side impact so that lateral deformations cannot occur without corresponding acceptance of the deformation energy.

In a further embodiment of the invention, the impact elements are part of the side body parts. In consequence, the impact elements can already be provided within the carcass of the side body parts—of the side doors, for example.

In a further embodiment of the invention, the impact elements are configured as assembly parts which can be inserted in the side body parts.

In the case of embodiments as assembly parts, the structure and material of the impact elements can be individually selected to suit the desired deformation characteristic.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
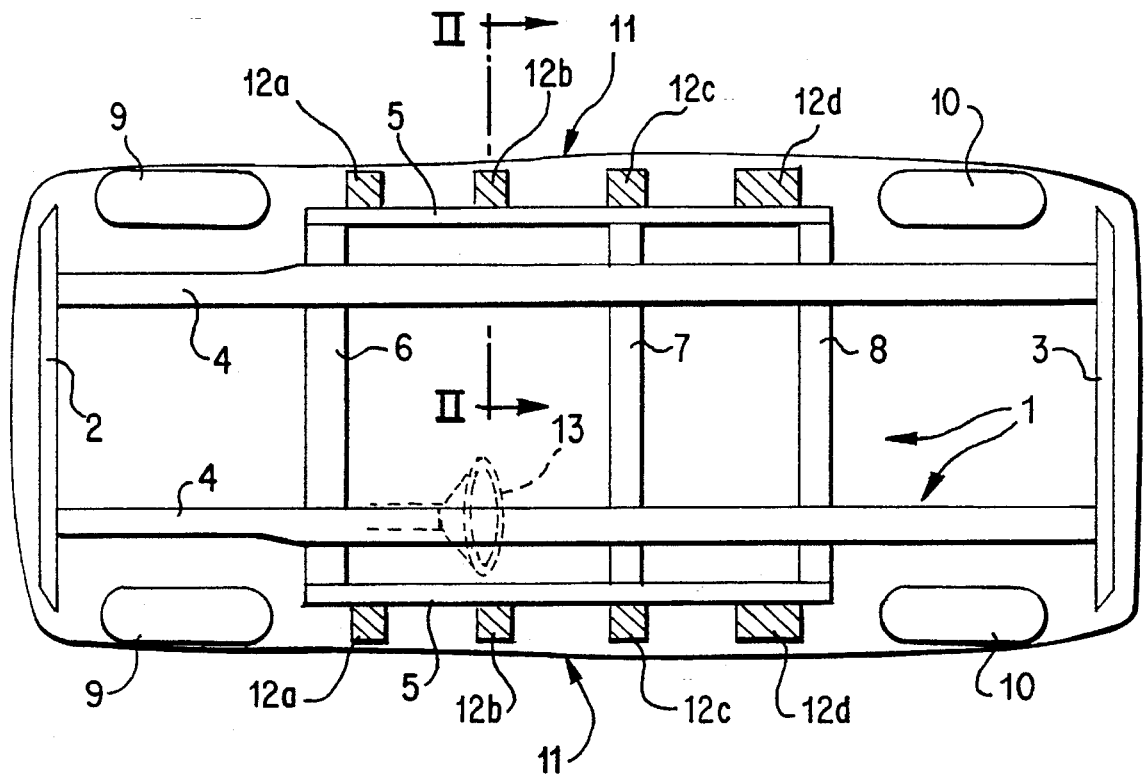
FIG. 1 shows a diagrammatic plan view of an embodiment of a motor vehicle constructed according to the invention, in which a plurality of energy-absorbing impact elements are arranged on both sides in the side body parts, the impact elements being distributed over the length of the passenger compartment between the front wheels and the rear wheels.
Figure 2:
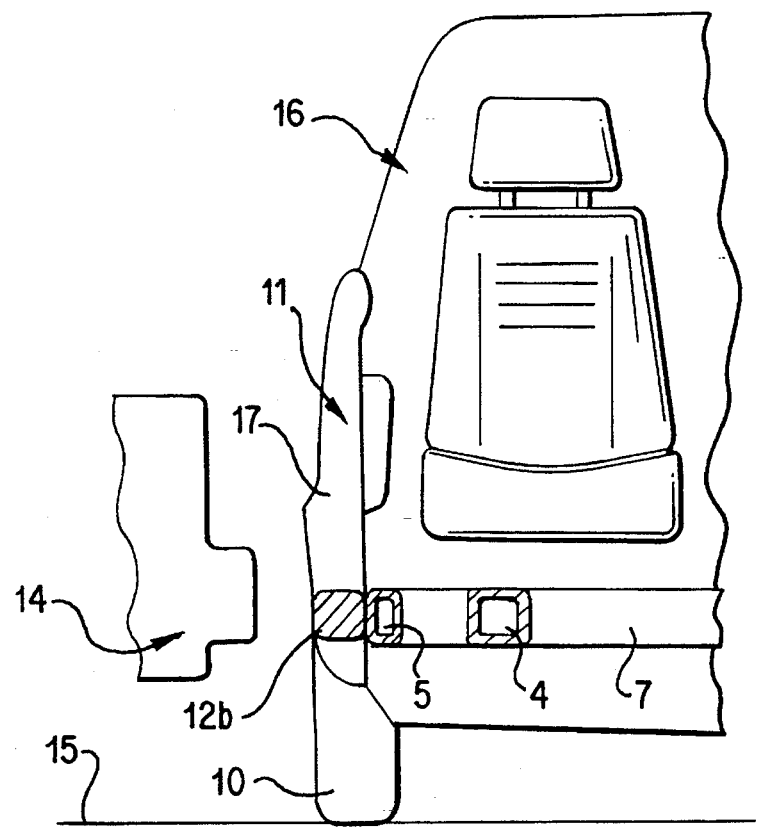
FIG. 2 shows a section through the right half—viewed in the direction of travel—of the motor vehicle of FIG. 1 along the section line II—II in FIG. 1.

The motor vehicle of FIG. 1 and FIG. 2 represents a small four-door car which is used, in particular, for local traffic. The motor vehicle has a stiff floor structure (1) which represents a support frame formed from a plurality of side members and crossmembers. A steering wheel (13) of the motor vehicle symbolizes the normal direction of travel of this motor vehicle from right to left—viewed in the plane of the drawing. In the region of the front of the vehicle, the stiff floor structure (1) has a bumper (2), which extends over the width of the vehicle and to which are connected two side members (4) extending parallel towards the rear. The two side members (4) are connected together in the rear region of the vehicle by a further bumper (3) which corresponds to the front bumper (2) and likewise extends over the width of the vehicle.

The stiff floor structure (1) has further stiffening members (5, 6, 7, 8) in the region of a passenger compartment (16) which essentially extends over the space between the front wheels (9) and the rear wheels (10). These stiffening members (5, 6, 7, 8) are arranged in the same plane as the two side members (4) and the bumpers (2 and 3). The stiffening members (5, 6, 7, 8) are formed by a front crossmember (6), by a central crossmember (7) and by a rear crossmember (8) which crossmembers (6, 7, 8) extend transverse to the two side members (4) and protrude outwards on both sides beyond the two side members (4). At their ends, the three crossmembers (6, 7, 8) are respectively connected to a side sill (5) which extends parallel to the associated side member (4) between the respective front wheel (9) and the respective rear wheel (10). The two side doors (11) arranged one behind the other laterally adjoin each of the two side sills (5) on the outside.

The stiff floor structure (1) formed in this way is arranged in the motor vehicle at such a height relative to a roadway (15) that it is located at the same height as bumpers (14) of other motor vehicles. Because the height arrangement of bumpers relative to the roadway (15) is standardized, there is also a defined position for the location of the stiff floor structure (1) relative to the roadway (15). The floor structure (1) also forms the floor of the passenger compartment (16) so that the vehicle seats are arranged above the floor structure (1).

Four energy-absorbing impact elements (12a, 12b, 12c and 12d) are respectively arranged on each side of the motor vehicle at the height of the stiff floor structure (1), and therefore, at the height of each side sill (5). In the illustrated embodiment, the impact elements (12a to 12d) are distributed in the front and rear side doors (11). The impact elements (12a, 12b) are arranged in the front side doors (11) and the impact elements (12c and 12d) are, on the other hand, arranged in the rear side doors. In the illustrated embodiment, the impact elements (12a to 12d) are of cubical or cuboid configuration and are manufactured from a plastic foam with energy-absorbing properties.

In other embodiments of the invention, the impact elements are manufactured from honeycomb-type plastic or aluminum parts, from aluminum extruded profiles, or from aluminum or steel sheet-metal elements. The impact elements (12a to 12d) respectively extend over the complete depth of the side doors (11). They, therefore, adjoin the surface of the outer skin (17) of each side door (11), on the one hand, and, on the inside, adjoin the surface of the respective side sill (5), on the other.

In an embodiment of the invention which is not shown, a single energy-absorbing impact element extends over the complete length of each side sill (5) and is arranged in a side body part fixed to the body. In this embodiment, the side doors adjoin the impact element from above.

If a side impact from another motor vehicle introduces an impact load at the height of its bumper (14), deformation energy decays immediately after the impact due to the impact elements (12a to 12d). The impact elements (12a to 12d) therefore have the function of a supporting core between the outer shell (17) and an inner shell of the side doors (11) and, therefore, of the side sills (5). There is, therefore, a direct force path immediately after the introduction of the impact load. The deformation characteristic can be selected in such a way by means of the material and construction of the impact elements that there is a suitable relationship, in terms of the risk of injury to the vehicle occupants, between the tolerable deformation depth and the contact velocity of the vehicle occupants.

The construction according to the invention is especially advantageous for small cars in local traffic situations.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle comprising:

a front bumper and a rear bumper disposed at a common bumper height, a stiff, generally rigid floor structure disposed at the common bumper height and including at least one longitudinal member connecting the front and rear bumper and a plurality of transverse stiffener members spaced longitudinally with respect to one another and extending transversely outwardly of said at least one longitudinal member, vehicle side body parts laterally bounding a passenger compartment supported at the floor structure, and a plurality of energy absorbing impact elements disposed in said vehicle side body parts at said common bumper height and distributed along a length of the passenger compartment immediately adjacent to the stiff floor structure, whereby said impact elements contribute to transverse stiffness of the vehicle by absorbing the impact energy and transferring collision forces to the floor structure.

2. Motor vehicle according to claim 1, wherein the impact elements are distributed in the side body parts over a length of the passenger compartment disposed between front wheels and rear wheels of the motor vehicle.

3. Motor vehicle according to claim 2, wherein the impact elements have a vehicle transverse width which corresponds approximately to a distance between an outer skin of the respective side body part and a side edge of the floor structure.

4. Motor vehicle according to claim 3, wherein the impact elements are part of the side body parts.

5. Motor vehicle according to claim 3, wherein the impact elements are configured as assembly parts which can be inserted in the side body parts.

6. Motor vehicle according to claim 1, wherein the impact elements are of cubical configuration and are made of plastic foam with energy-absorbing characteristics.

7. Motor vehicle according to claim 1, wherein the impact elements are manufactured from one of honeycomb-type plastic or aluminum parts, aluminum extruded profiles, and sheet metal elements.

8. Motor vehicle according to claim 1, wherein the vehicle is a four-door vehicle with two side doors at each vehicle side, wherein the impact elements are arranged in the side doors and extend across a complete lateral thickness of the side doors.

* * * * *